United States Patent [19]
Arndt et al.

[11] Patent Number: 5,900,700
[45] Date of Patent: May 4, 1999

[54] PROCESS AND CIRCUIT ARRANGEMENT FOR OPERATING COLD CATHODE DISCHARGE LAMPS

[75] Inventors: Joachim Arndt, Seulingen; Gunter Kullik, Meinerzhagen, both of Germany

[73] Assignee: Patent-Treuhand-Gesellschaft fur elektrische Gluhlampen mbH, Munich, Germany

[21] Appl. No.: 08/875,078

[22] PCT Filed: Nov. 21, 1996

[86] PCT No.: PCT/DE96/02233

§ 371 Date: Jul. 17, 1997

§ 102(e) Date: Jul. 17, 1997

[87] PCT Pub. No.: WO97/19574

PCT Pub. Date: May 29, 1997

[30] Foreign Application Priority Data

Nov. 21, 1995 [DE] Germany ............... 195 43 419

[51] Int. Cl.⁶ .................................................. G05F 1/00
[52] U.S. Cl. .................... 315/291; 315/312; 315/278; 315/255; 315/DIG. 5
[58] Field of Search ................... 315/291, 312, 315/224, 219, 209 R, 276, 278, DIG. 5, 210, 255, 324

[56] References Cited

U.S. PATENT DOCUMENTS

| | | | |
|---|---|---|---|
| 4,394,603 | 7/1983 | Widmayer | 315/311 |
| 4,508,996 | 4/1985 | Clegg et al. | 315/224 |
| 4,667,133 | 5/1987 | Nilssen | 315/312 |
| 5,053,681 | 10/1991 | Budny et al. | 315/219 |
| 5,387,845 | 2/1995 | Nilssen | 315/209 R |

FOREIGN PATENT DOCUMENTS

| | | |
|---|---|---|
| 0439240 | 7/1991 | European Pat. Off. . |
| 0439864 | 8/1991 | European Pat. Off. . |
| 4204020 | 8/1993 | Germany . |
| 83/00271 | 1/1983 | WIPO . |
| 83/02537 | 7/1983 | WIPO . |

*Primary Examiner*—Don Wong
*Assistant Examiner*—Haissa Philogene
*Attorney, Agent, or Firm*—Carlo S. Bessone

[57] ABSTRACT

A first intermediate direct voltage is generated from a current source or onboard voltage, and a second sinusoidal intermediate alternating voltage is generated with a current inverter. This intermediate alternating voltage is transformed by one or more transfer systems to the various triggering and maintaining voltages of different cold cathode discharge lamps. Frequency-synchronous dimming is regulated by the pulse-pause ratio of a pulse group regulator in a broad frame by optically commanded triacs which are triggered in the zero crossing. The preconditions for the starting and maintenance characteristics of the lamps are thus always ensured.

14 Claims, 2 Drawing Sheets

PROCESS AND CIRCUIT ARRANGEMENT FOR OPERATING COLD CATHODE DISCHARGE LAMPS

FIELD OF THE INVENTION

The invention relates to a method and circuitry for operating cold cathode discharge lamps, specifically cold cathode fluorescent lamps as defined in the preambles to claims 1 and 12.

Discharge lamps with cold cathodes—thus without heating spirals—are always used as an illuminant when a high degree of light efficiency is needed.

BACKGROUND OF THE INVENTION

Because there is no heating spiral, these lamps are particularly suited for a long service life in a harsh environment. These lamps are used preferably in automobile design, for example, due to their lack of sensitivity to impacts and shaking.

The design of this illuminant allows it to be used for irregular geometries; thus tube-shaped designs with an outer diameter of 3–6 mm and a length of a few decimeters, for example, are known. The designs can be manufactured to be curved, coiled or meandering.

To start the discharge process, a high voltage, which can amount to several thousand Volt, is needed. The burn voltage after firing can still amount to several hundred Volt.

The necessary burn current is in a range between 1 to 20 mA, depending on the design of the lamp geometry.

The lamp is started simply by applying high-tension a.c. voltage, which may—as soon as the firing procedure is completed—be broken down to the burn voltage via the initial current.

The characteristic curve of the luminous intensity in relation to the temperature necessitates that the lamp burn current be tracked under certain extreme environmental conditions.

Since this characteristic curve does not run linearly and even exhibits turning points, it is only possible to fulfill the requirement for a constant light progression in the specified temperature range with great expense.

Due to the increasing use of cold cathode discharge lamps in the illumination of instruments in automobile design, a large setting range of brightness is required in order to ensure a corresponding darkening or dimming of the lighting during changing environmental brightness. Darkening values and dim rates from 1 to 1000 are required.

The firing voltages and burn currents are generally made available by means of varying transformatoric means. Solutions with freely-oscillating flyback converters or semiconductor-switched push-pull converters are known, which are self-controlled according to the current saturation principle and adjust to the respective operating conditions. One example of such circuitry is known from U.S. Pat. No. 5,053,681, whereby relatively high-frequency operating currents from the a.c. voltage supply in the system are generated and distributed to feed the fluorescent lamps. However, these converters are very costly and inefficient for use in the broad voltage range needed in automobile design. Additionally, the control option for this type of converter is severely limited. Darkening and dimming are only possible by altering the voltage. Examples of this design are known from DE-A-42 04 020 and WO-A-83 02 537. The first specification relates to the phase control of neon tubes in luminary advertisements; the second specification comprises a fluorescent lamp ballast for gas-discharge lamps in which the brightness control of the lamps is achieved by altering the operating frequency.

If, however, to illuminate an instrument panel, for example, a plurality of lights with varying geometries and thus variable firing and burn voltages is used, and if the individual lamps are mounted far apart from one another, then an individual voltage source would be needed for each lamp. A joint dimming with the goal to darken or brighten all lights synchronously in the same way and with equal intensity can only be achieved via great expense and losses or is not possible at all.

A large number of freely-oscillating converters would make it very difficult or impossible to sufficiently eliminate interference in a high-frequency range with the varying frequencies for the various operating conditions.

Major problems are also caused by arranging a plurality of high-voltage lines parallel from one or a plurality of converters to the remotely-located lamps, particularly if the a.c. voltages are selected in the kHz range and these voltages have a phase relationship that deviates from one another.

BRIEF SUMMARY OF THE INVENTION

It is the object of this invention to accomplish a method and circuitry for operating cold cathode discharge lamps in motor vehicles with which the requirements specified above can be fulfilled in a simple manner without the occurrence of the indicated problems.

The object is accomplished by means of the characteristic features in claims 1 and 12. Additional advantageous features are indicated in the subordinate claims.

Thus, the object of the invention is attained and allows for the generated a.c. voltage to be distributed and guarantees the required high dim rate, and offers the solution for tracking the light intensity even under the extreme climatic and test conditions in the automobile industry.

The core concept of the new design is to generate a stable intermediate voltage so that the increase in the onboard voltage of the vehicle or the respective current source is achieved to the firing and burn voltages of the lamps in at least two steps. According to the invention, the increase of the firing voltage necessary for each lamp is achieved in the second stage and in the direct vicinity of the lamp connections.

Examples of the staged change, e.g., of the system voltage to the firing and burn voltages of the lamps, are known from WO-A-94 27 419 and U.S. Pat. No. 4,508,996, whereby in these specifications, the normal system voltage or a 3-phase voltage is first rectified and forwarded as a d.c. voltage to the various sites within an application complex, where it is converted back into an a.c. voltage.

A frequency-stable, external-controlled push-pull converter, working below its saturation point, is used to achieve this process.

A high converter frequency was chosen based on the greatest possible dim rate and a high dimming frequency beyond the flicker sensitivity of the human eye. This frequency additionally allows for the use of low inductances, which is advantageous for the installation area.

BRIEF DESCRIPTION OF THE DRAWINGS

The invention is described in detail below by way of FIGS. 1 and 2.

Shown are in.

BEST MODE FOR CARRYING OUT THE INVENTION

Figure 1:
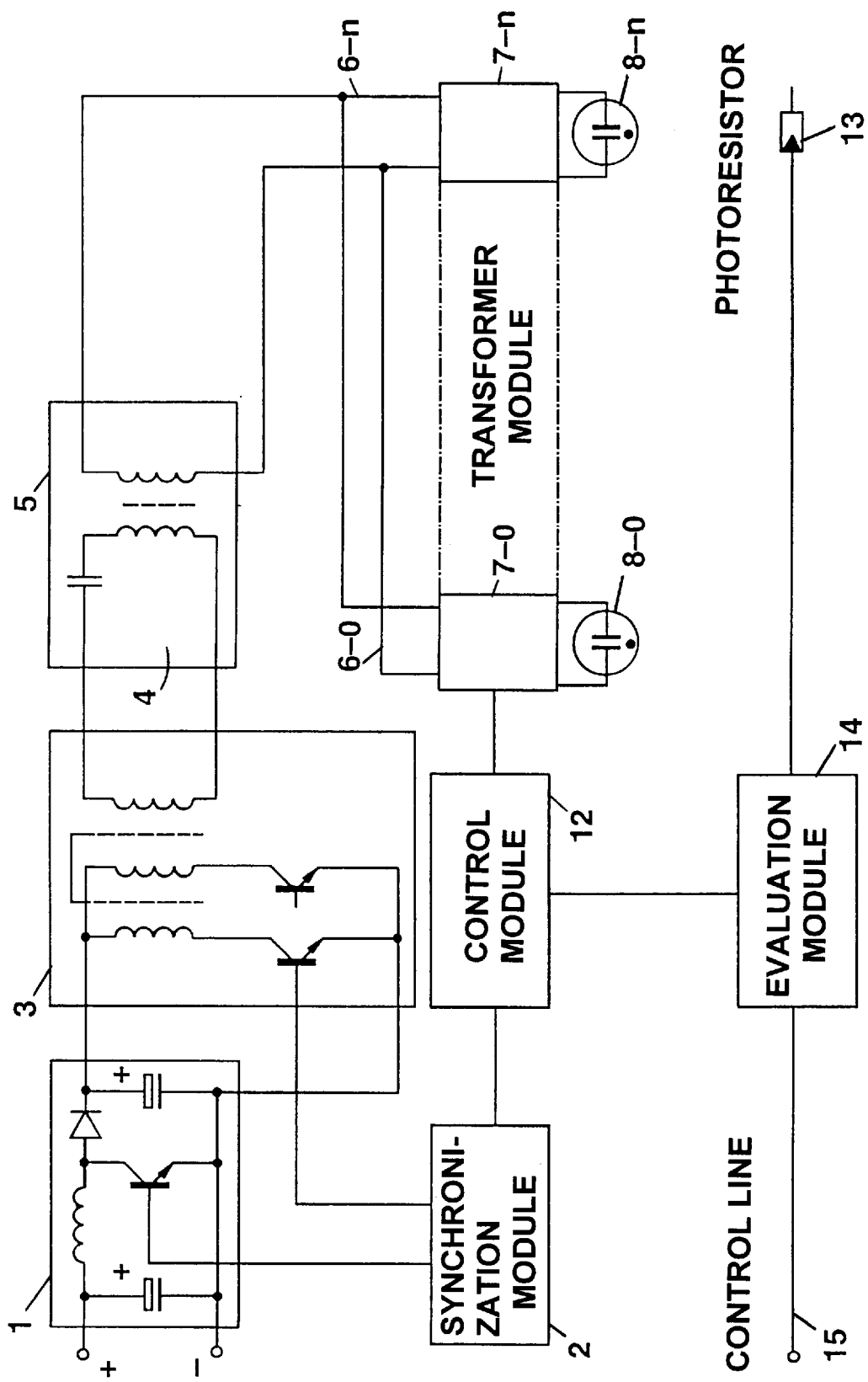
FIG. 1 a simplified form of the converter set-up according to the invention. It comprises a boost converter 1 that is controlled and regulated by means of a synchronization module 2. The subsequent block represents a push-pull converter 3, the square-wave output frequency of which is formed sinusoidally in a resonance circuit 4. The subsequent transformer 5 has a loadable secondary winding to which the sinusoidal frequency is attached with an intermediate voltage of approx. 48 Volt and approx. 50 kHz. This voltage of approx. 48 Volt was intentionally selected as the currently valid limit for a protective low voltage so that the distribution of the current paths for this voltage is not hazardous and is unproblematic with low insulating means. From transformer 5, the distribution is achieved by means of lines that are arranged parallel and are indicated with 6-0 to 6-n on the individual transformer modules 7-0 to 7-n, which each supply—and to a certain degree individually—a single discharge light 8-0 to 8-n.
Figure 2:
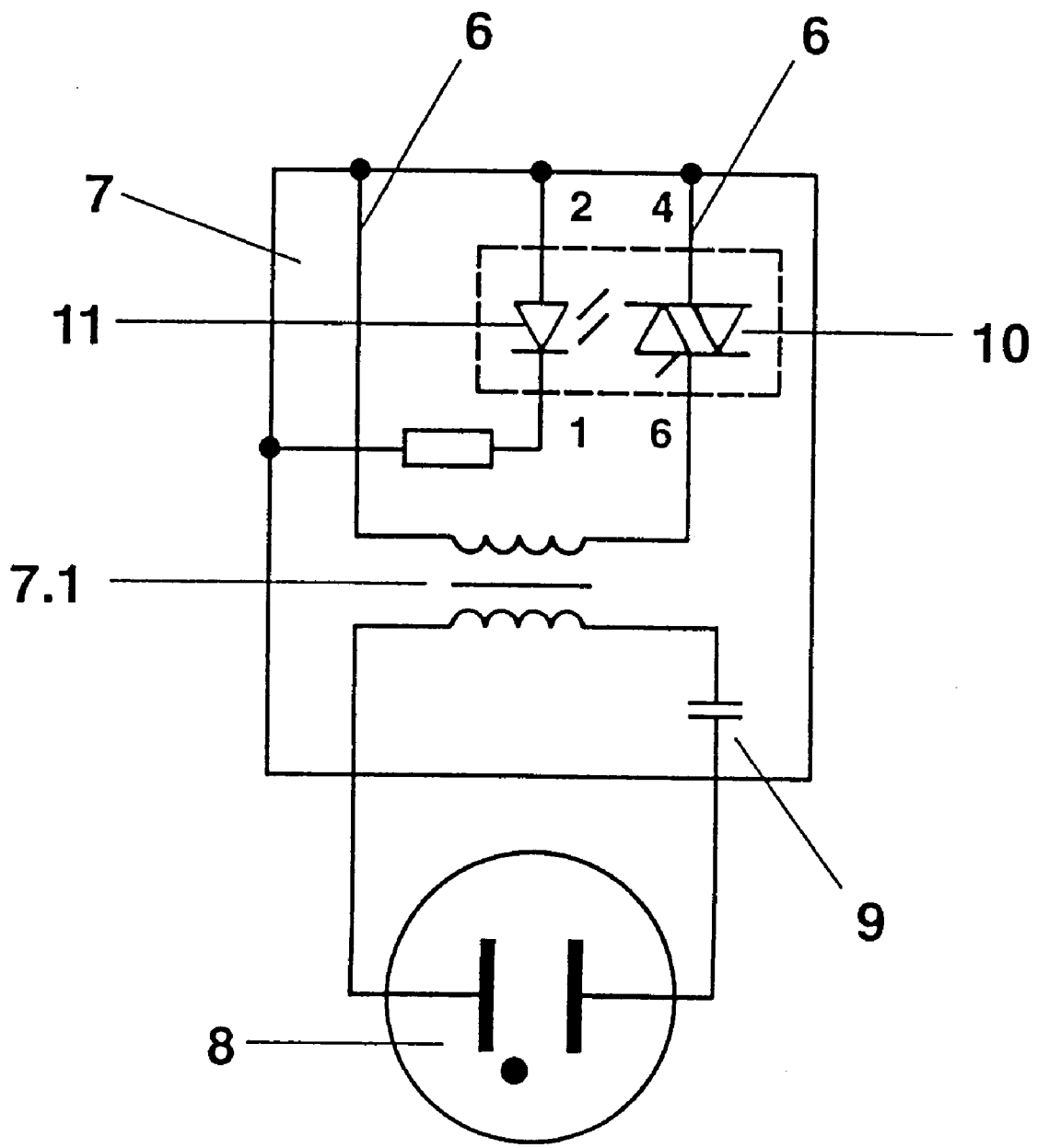
FIG. 2 transformer module 7 in detail. The core unit is transformer 7.1, which transforms the intermediate a.c. voltage from transformer 5 into the respective high voltage necessary for special lamp 8-0 to 8-n. A capacitor 9 is disposed in the output circuit of the transformer, which capacitor is effective as a capacitive series resistance. Furthermore, an optically-controlled triac 10 lies in the primary circuit of transformer 7.1, which triac receives its firing commands by means of a firing LED 11, which is in turn controlled by means of the control module 12. Instead of opto-triac 10 and control LED 11, other switching devices can be used, thus, a rectifier bridge and a thyristor or a corresponding semiconductor combination are possible, for example, but are not pictured. Further, transformer couplings of the control command are conceivable and possible instead of the LED-opto combination. Transformer modules 7 together with transformer 7.1, triac 10 and firing LED 11 form a module, a unit that, in a particular embodiment, can be a component of the lamp socket for a respective discharge lamp. The arrangement in FIG. 1 is completed by means of a brightness meter—here a photoresistor 13—that provides a measured value of the brightness to the evaluation module 14. By means of a control line 15, set values for the brightness are fed into the system. The commands to alter the brightness can be implemented manually or via a primary system.

Boost converter 1 is operated from a current source—in this example, from the vehicle's onboard voltage in a voltage range of 8–18 Volt—and converts the input voltage to a stable initial intermediate voltage of approx. 60 Volt d.c. voltage. Current sources can, of course, be any desired mains, battery or onboard voltage.

Boost converter 1 is controlled by means of frequency-stable synchronization module 2, which also settles the fluctuating parameters: input voltage, current consumption (by means of the sequential circuit) and the temperature influences.

In the second stage, the push-pull converter 3, intermediate voltage, again frequency-stable and synchronous, is converted back into a.c. voltage. The output and function of the converter are based on the effect of sintonized resonance circuit 4 in which the previous steep switching flank is converted to a sinusoidal frequency curve.

The load is decoupled at low ohm's at the resonance converter circuit—consisting of 3, 4, and 5—by means of transformer 5, whereby the intermediate a.c. voltage of approx. 48 Volt at approx. 50 kHz is distributed parallel to the necessary number of lines 6-0 to 6-n.

This intermediate a.c. voltage is available at each transformer module 7-0 to 7-n at each termination point of lines 6-0 to 6-n. The winding ratios of transformer 7.1 are adjusted to the requirements of each lamp 8-0 to 8-n and their firing voltages so that for each type of lamp, another voltage can be absolutely used. If one of lamps 8-0 to 8-n should burn at full brightness, then applicable triac 10 receives a firing impulse by means of firing LED 11 from control module 12 synchronously and exactly in the zero crossing of the intermediate a.c. voltage (this control occurs individually and especially for each lamp). The triac, due to its internal function, remains conductive each time for the duration of a half wave and is refired at the next half wave. As long as the triac is conductive, the intermediate a.c. voltage remains in contact with transformer 7-1.

If a darkening state is desired or is necessary for one lamp or for all of the lamps due to the operating conditions, then the on/off switch relationship is switched with regard to a dim frequency of approx. 50 Hz by means of control module 12; thus pulse blocks are possible from a few sinus complete waves in the framework of 1:1000. A method of this type is known, for example, from EP-A-04 39 240. Thus the requirements for the optimal firing and burn voltage are retained and the lamp function is ensured. Dim or darkening requirements can be supplied either by the user in general by means of control line 15 or are conditioned by means of evaluation module 14 as controlled magnitude from the actual value results of the reference measurement at 13 and then converted into a pulse-pause ratio in module 12.

Using this type of reference monitoring of brightness of one—or in another exemplary embodiment of all the individual lamps—the temperature influence on the luminous strength of the lamps is also settled; in fact, a maximum (100%) continuous duty in the proximity of the lowest occurring temperature and thus the possible brightness are set.

For all other temperatures, the lamps are in a more or less darkened or dimmed condition. Thus, the design of the broad dim range is of benefit here. In the secondary circuit of high-voltage transformer 7.1, one capacitor 9 is switched in series to light 8; until firing, no significant current flows into the lamp so that almost the complete firing a.c voltage is at the lamp. After starting of the burn current, the difference between the firing voltage and the burn voltage drops via the capacitor. The capacitors are adjusted to the current demand and burn voltage applicable to the lamp.

We claim:

1. A method to fire and operate one or more cold cathode discharge lamps (8-0 to 8-n), specifically cold cathode fluorescent lamps in a motor vehicle with equal or varying firing and burn voltages, whereby the cold cathode discharge lamps (8-0 to 8-n) can additionally be darkened or dimmed individually or combined, characterized by the steps of generating a stable intermediate a.c. voltage, controlling said intermediate a.c. voltage, providing a high voltage necessary for firing and operation, increasing the high voltage over a minimum of two stages from an onboard voltage.

2. The method as defined in claim 1, characterized in that a stable d.c. voltage is generated from any current source, which voltage is converted into a frequency-stable and voltage-stable intermediate a.c. voltage with sinusoidal curve shape.

3. The method as defined in claim 1, characterized in that the intermediate a.c. voltage lies within a voltage range in which distribution to a plurality of lamp sites that are separated from one another is possible without hazard and with low insulation media.

4. The method as defined in claim 1, characterized in that the intermediate a.c. voltage is transformed with the assistance of one or more transformer systems (7-0 to 7-n) in the direct vicinity of one or more cold cathode discharge lamps (8-0 to 8-n) to the necessary firing voltage of one or more cold cathode discharge lamps (8-0 to 8-n).

5. The method as defined in claim 4, characterized in that the transformer system(s) (7-0 to 7-n)—each in the zero crossing of the intermediate a.c. voltage—is(are) switched on by means of a signal from a control circuit (12) synchronous to the intermediate a.c. voltage.

6. The method as defined in claim 4, characterized in that the continuous duty of the cold cathode discharge lamps (8-0 to 8-n), which are regulated by means of the control circuit (12), is freely selectable and is alterable in proportion to a switch-off pause.

7. The method as defined in claim 4, characterized in that the switch-on of the cold cathode discharge lamps (8-0 to 8-n) is achieved by means of a control circuit (12) without interference—in the sense of high-frequency interference—while in the zero crossing of the intermediate a.c. voltage, and extinguishes and can be switched on again at the end of a current flow after each half wave.

8. The method as defined in claim 5, characterized in that the switch-on command from the control circuit (12) arrives galvanically separated at an electronic switch.

9. The method as defined in claim 1, characterized in that the degree of darkening or dimming of one or all of the cold cathode discharge lamps (8-0 to 8-n) is controlled manually or remotely.

10. The method as defined in claim 9, characterized in that the degree of darkening or dimming is regulated depending on the measured luminance of one or all of the cold cathode discharge lamps (8-0 to 8-n).

11. The method as defined in claim 9, characterized in that 100% illumination occurs at the lowest ambient temperature so that all illuminations appear darkened or dimmed at higher temperatures.

12. The method as defined in claim 2, characterized in that the intermediate a.c. voltage lies within a voltage range in which distribution to a plurality of lamp sites that are separated from one another is possible without hazard and with low insulation media.

13. The method as defined in claim 2, characterized in that the intermediate a.c. voltage is transformed with the assistance of one or more transformer systems (7-0 to 7-n) in the direct vicinity of one or more cold cathode discharge lamps (8-0 to 8-n) to the necessary firing voltage of one or more cold cathode discharge lamps (8-0 to 8-n).

14. The method as defined in claim 3, characterized in that the intermediate a.c. voltage is transformed with the assistance of one or more transformer systems (7-0 to 7-n) in the direct vicinity of one or more cold cathode discharge lamps (8-0 to 8-n) to the necessary firing voltage of one or more cold cathode discharge lamps (8-0 to 8-n).

* * * * *